Dec. 31, 1929.　　　　C. H. RANKIN　　　　1,742,098
METHOD OF AND APPARATUS FOR CHARGING MOLTEN GLASS INTO MOLDS
Filed Aug. 15, 1927　　　2 Sheets-Sheet 1

INVENTOR
Carl H. Rankin,
BY
ATTORNEY

Dec. 31, 1929.  C. H. RANKIN  1,742,098
METHOD OF AND APPARATUS FOR CHARGING MOLTEN GLASS INTO MOLDS
Filed Aug. 15, 1927  2 Sheets-Sheet 2
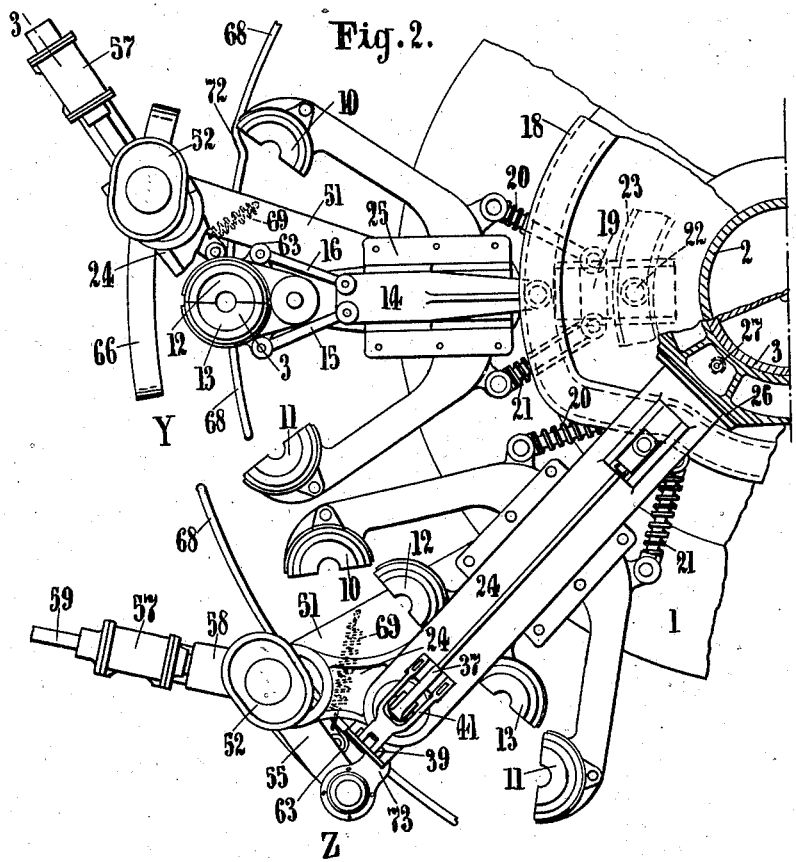
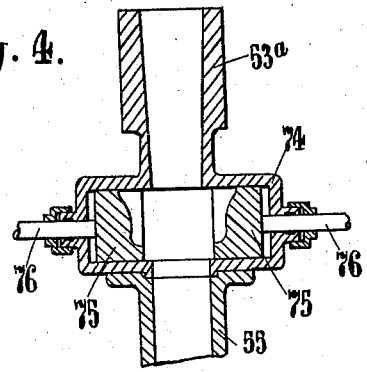
INVENTOR
Carl H. Rankin,
BY
ATTORNEY Patented Dec. 31, 1929

1,742,098

UNITED STATES PATENT OFFICE

CARL HENRY RANKIN, OF YORK, ENGLAND, ASSIGNOR TO RANKIN AUTOMATIC GLASS FEEDER COMPANY, LIMITED, OF YORK, ENGLAND

METHOD OF AND APPARATUS FOR CHARGING MOLTEN GLASS INTO MOLDS

Application filed August 15, 1927, Serial No. 213,130, and in Great Britain August 31, 1926.

This invention relates to an improved method of and apparatus for delivering successive charges of molten glass into molds, for example, the parison molds of a hollow glassware making machine of the type in which the molds are successively presented to and fed by an automatic glass feeder operating in timed relation with the movements of the molds which may be caused to travel around a circular path either continuously or intermittently, as required.

The purpose of this invention is to eliminate the necessity of inverting the parison molds of a hollow glassware making machine for the purpose of feeding a charge of molten glass to such molds. It will readily be understood that the inversion of the parison molds requires the employment of complicated mechanism in known types of hollow glassware making machines, and the use of the device described hereafter considerably simplifies the design of a machine to operate in conjunction therewith.

The said invention provides a method of feeding a severed mold charge to the lower end or opening of a parison or other mold, and propelling this charge upwardly into the mold. This method can be carried into practice by sealing the lower opening of the mold with the molten glass, exhausting air from the said mold and applying air pressure behind the charge to propel it upwards into the mold. The apparatus can conveniently comprise a U shaped funnel or other suitable guide for the purpose of feeding a mold charge to the lower opening of the mold, and for conducting air to the mold for raising the charge therein.

The improved apparatus can be conveniently combined with a machine comprising a number of hollow glassware manufacturing units carried on a table or machine ring in such a manner that they can be rotated around a stationary central column and an air supply chamber.

In the accompanying drawings:

Figure 2 is a plan view of two units of the machine partly shown in Figure 1.

Figure 4 is a sectional view of part of the said funnel.

Figure 1:
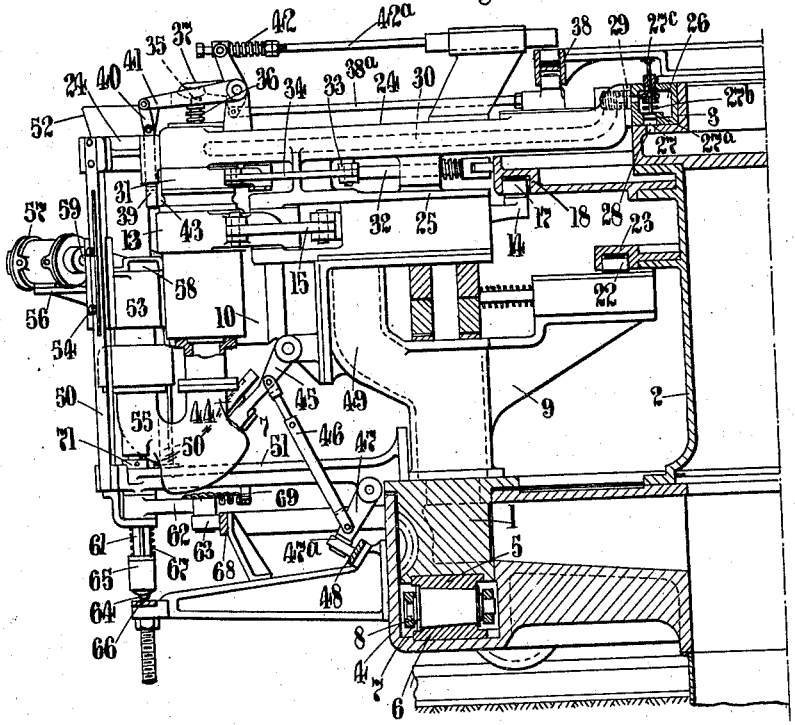
Figure 1 is a side view of a single unit of a rotary glassware manufacturing machine, provided with means according to this invention, for receiving mold charges and delivering the same to the parison mold.

As indicated in these drawings, a number of hollow glassware manufacturing units are carried on a table or machine ring 1 in such a manner that they can be rotated around a stationary central column 2 and an air supply chamber 3. The machine ring 1 is guided in a circular groove or track machined in the bedplate 4 and is provided at its outward edge with worm teeth arranged to engage with a worm rotatably mounted in bearings machined in the bedplate and rotated by a variable speed electric motor or other source of power for the purpose of rotating the machine.

The underside of the machine ring 1 is provided with a steel race 5, whilst a similar race 6 is supported by the bedplate. A number of hardened steel taper rollers 7 are carried in a cage 8 and are interposed between the races 5 and 6 for the purpose of providing an anti-friction thrust and journal bearing for the rotating portion of the machine.

Each unit of the machine comprises a main frame 9 arranged to support the two hinged halves 10 and 11 of a blow or finish mold, and two hinged halves 12 and 13 of a parison mold. A slide bracket 14 carries at its outer end two links 15 and 16 which are connected in turn to the parison mold halves, whilst a roller 17 is carried at the inner end of slide bracket 14 and engages in a cam track 18 rigidly supported on the central column 2, for the purpose of opening and closing the parison mold halves. A similar slide bracket 19 carries links 20 and 21, and a roller 22 in engagement with a non-rotating cam track 23 is arranged to open and close the finish mold halves in timed relation with the rest of the machine operations.

A radial arm casting 24 is bolted on to a facing formed immediately above the parison slide guideway 25 and carried at its outer end a blowing head, plunger and mold lock mechanism and the hinged halves of a neck mold with its associated operating mechanism, the inner end of such radial arm being bolted to a rotary valve or slip ring 26.

Valved ports 27 in the slip ring are arranged to coincide with ports 28 in the air supply chamber 3, such chamber being divided into compartments one of which supplies air for blowing the blank, another air for blowing the finished article, whilst a third is connected to an exhauster and provides the vacuum necessary for drawing in the charge and for the formation of the neck of the ware. Each of the afore-mentioned compartments are connected to the blowing head in turn by the valved port 27 as the slip ring is rotated around the air supply chamber. The valve 27$^a$ is capable of being opened against the action of a spring 27$^b$ by an adjustable cam 27$^c$. By this means it is possible to vary both the position at which vacuum or blowing air is supplied to the blowing head and also the length of time such vacuum or blowing air is supplied.

A spring loaded washer 29 is arranged at the joint between the radial arm and the slip ring to prevent leakage at this point and a cored passage 30 extends the full length of the radial arm and terminates at the blowing head. The absence of joints between the blowing head and the air supply chamber is a special feature of the machine and ensures the total elimination of the numerous troubles arising from air and vacuum leakages.

The neck mold 31 comprises two hinged halves interposed between the blowing head and the parison mold (Figure 1). This neck mold 31 is arranged to be opened and closed by means of a cam operated spring loaded slide bar 32, a shackle 33 and links 34. The plunger spindle 35 is normally kept in its upward position by a spring 36 and is capable of being depressed by a bell crank lever 37 operated by the underside groove of a double track cam 38, through a rod 38$^a$. A mold lock device is provided comprising a sliding fork 39, coupled by a link 40 to a bell crank lever 41, operated through an interposed spring 42 by a rod 42$^a$ and a roller in engagement with the upper groove of the cam 38. The fork 39 engages taper lugs 43, one of which is cast on each mold half, and thereby holds such mold securely together.

A bottom block 44 is carried on a swinging lever 45, the pivotal support of which is adjustable vertically, and is brought into engagement with the underside of the finish molds by a telescopic connection 46, and a swinging lever 47 carrying a roller 47$^a$ in engagement with a cam track 48.

Cooling air for the molds is conveyed through hollow arms in the bedplate to cored recesses communicating therewith in the machine ring 1 and is then conveyed through the hollow unit casting 9 to a distributing pipe 49 immediately in front of the finish mold hinge and is conveyed from there to the various parts of the machine by pipe lines (not shown).

The foregoing description is intended to make clear the simplicity of a hollow glassware manufacturing machine arranged to be fed by the improved charge feeding device hereafter described, such simplicity being attributed to the fact that it is not necessary to rotate or invert the parison molds when feeding them with a charge of molten glass, but such mechanism is not essential to this invention.

Figure 3:
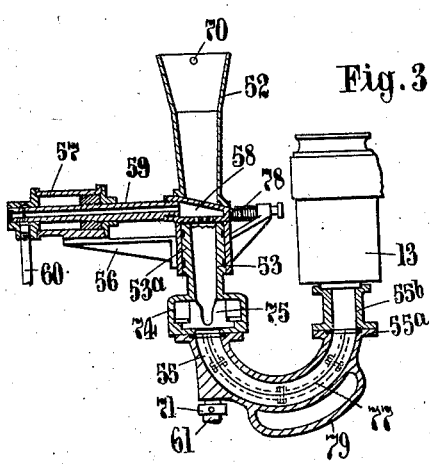
Figure 3 is a detail view of a feeder funnel comprised in the machine unit.

An important feature of this invention is the funnel shown separately in Figure 3. This funnel is adjustably mounted in vertical guide bars 50, such guide bars being supported at their upper ends by an extension of the radial arm casting 24 and at their lower ends by a bracket 51 bolted to the machine ring 1. The said funnel comprises three portions, an upper portion indicated at 52, an intermediate portion 53 rigidly bolted thereto and a lower portion 55. The intermediate portion 53 is machined to fit between and to be adjusted vertically along the bars 50, such bars being slotted to allow a set screw 54 to pass through them for the purpose of clamping the funnel at any desired height to suit parison molds of various lengths.

The lower portion 55 of the funnel takes the form of a U shaped bend, having a machined portion 53$^a$ which fits into the bore of the intermediate funnel after the manner of a hollow piston in a cylinder. This arrangement is shown quite clearly in Figure 3 and it will be seen that the lower funnel 55 is quite free to move upwards or downwards, or to swing from side to side within the intermediate funnel 53. The outlet end of the lower funnel 55 has a taper recess machined in it to correspond with a projection machined on the underside of the parison molds and is also provided with a drilled flange 55$^a$ to facilitate the securing of an extension 55$^b$ at this point for the purpose described hereafter.

The intermediate funnel 53 supports a bracket 56 which in turn carries an air cylinder 57 and such air cylinder is arranged to move a hollow tapered slide block 58 across the opening of the funnel. A hollow piston rod 59 carrying the block 58 extends through the rear cylinder cover of the cylinder 57 and a series of holes make connection with a groove machined in such cylinder cover for the purpose of conveying compressed air from the pipe line 60 through the hollow slide block and into the lower funnel.

A rod 61 is securely fixed to the lower funnel and extends downwards through a boss in the bracket 51. A hardened steel ball 64 carried in a holder 65 at the lower end of the rod 61 travels on a cam track 66 for the purpose of raising the funnel when required against the thrust of a spring 67 tending to move the funnel to its lowermost position and an oscillatory movement is imparted to the funnel by an arm 62 acted upon by a spring 69 to hold a roller 63 on the arm 62 against a cam 68, the rod 61 being free to slide vertically through the said arm.

The mode of operation of these parts is as follows:—

The parison molds being closed and locked, and the plunger in its lowered position, when the roller 63, reaches the gap "Y" in the cam track 68, Figure 2, the spring 69 swings the lower funnel until it is directly underneath the parison molds. The steel ball 64 runs on to the track 66 which raises the funnel 55 into engagement with the tapered projection previously described. The slide block 58 is at this time drawn back leaving the funnel opening clear. A blast of air and oil or any substance that will form a vapour which will produce a film between a charge of glass and the wall of the U bend on lower funnel, is then blown into the top of the funnel through nozzles 70. As the funnel passes under the discharge orifice of a glass feeding device (not shown) a gather is dropped into the lubricated funnel, its velocity carrying it a part of the distance around the bend. After the gather has passed the slide block or gate 58, air is admitted to the back end of the air cylinder 57 which operates the said slide block and immediately the slide block or gate closes the top of the U bend, air under pressure is passed through the hollow piston rod 59 and out through the bottom of the slide block and thence into the U bend thereby exerting pressure on the gather or gob of glass which chokes the funnel and is forced or propelled under this pressure through the remainder of the U bend upwardly to the underside of the parison mold. The bore of the U bend is preferably made slightly smaller than the bore of the parison mold. When the slide block or gate 58 is closed, the valve 27ª opens the vacuum chamber to the passage 30 and vacuum is applied at the top of the parison mold so that the suction and pressure together draw the glass up into this mold and into the neck ring. The suction is maintained to support the parison blank whilst the U bend is moved clear and until a bottom or baffle plate 73 (Figure 2) is moved into position to close the bottom opening of the parison mold. To effect this the steel ball 64 runs off the track 66 allowing the spring 67 to pull down the lower funnel 55 just the depth of the tapered projection on the bottom of the parison mold, a collar 71 limiting this movement. The roller 63 on coming into contact with a rise 72 in the cam track 68 swings the funnel 55 until the baffle plate 73 seals the underside of the parison mold. The funnel is maintained in this position during the time blowing air is admitted into the blowing head and the blank or parison is "blown up", whereupon the roller 63 engages with a further projection or rise on the cam track 68 which swings the funnel and plate 73 clear from beneath the mold to the position shown at "Z" in Figure 2.

It is of course necessary that the outlet end of the lower funnel should make contact with the lower end face of the parison molds, and to avoid the necessity of replacing the whole of the lower funnel 55, to suit different molds an interchangeable extension 55ᵇ hereinabove mentioned is provided having the baffle plate 73 formed integrally therewith.

As an alternative to the method of operation described, the upper funnel 52 can be made in the form of a receptacle to receive a charge of molten glass. In this case the slide block 58 closes the opening in the funnel, forming a bottom for the receptacle, molten glass is fed into such receptacle and is held there until the slide block is removed to allow it to pass onward to the parison mold. Immediately such charge has passed, the slide block can be moved forward to seal the opening, and the charge forced into the mold by air pressure as previously described.

The part of the funnel below the slide block 58 may serve as an initial parison forming receptacle, and for this purpose comprises a chamber 74 enclosing guide blocks 75 movable to different positions in the chamber by means of rods 76. The opposed faces of the blocks 75 may be of any suitable contour, for example, they may be recessed, as shown in Figures 3 and 4, so that if the blocks 75 are brought into contact closing the thoroughfare through the funnel, the lower part of a gather detained by these blocks is brought to a shape substantially as shown in Figure 3 in which the lower part of the gather is of smaller diameter than the bore of the funnel part 53ª. The blocks 75 are drawn apart at appropriate times to allow the shaped and partially solidified gather to pass into the part 55 of the funnel. When the blocks are held thus separated a gather can pass from the funnel portion 53ª to the funnel portion 55 to all intents as would be the case if the walls of the portions 53ª, 55 are made continuous forming a tubular track of constant cross section.

The funnel portion 55 can be made in two halves the joint 77 being arranged parallel to the axis of the bend so that the upper half can be easily removable for cleaning or inspection purposes.

An adjustable spring stop or buffer 78 is arranged so that the slide block does not jam tightly in its wedged shape guide.

The funnel 52, 55 may be constructed to have any appropriate cross section and the slide block 58 can be arranged in any convenient position between the inlet and outlet ends thereof. The funnel may be provided with a jacket 79 through which a current of air, water or other cooling fluid can be conducted.

In known types of glassware making machines receiving charges from a feeder, it is necessary to invert the parison molds to allow the charges to be fed into them and this invention, by eliminating the necessity for such inversion considerably simplifies the mechanism requisite for the operation and control of machines to which it is applied.

I claim:

1. Apparatus for delivering a charge of molten glass to a mold, comprising a funnel, a hollow slide block, a piston movable in a cylinder, a hollow piston rod connecting the piston to the slide block to move the latter to open and close the thoroughfare through the funnel, and air admission ports opened when the block is in its funnel closing position to admit air to the funnel through the hollow piston rod and the block.

2. Apparatus for delivering a charge of molten glass to a mold, comprising a U-shape funnel whereof one part is movable rotationally in the other part.

3. Apparatus for delivering a charge of molten glass to a mold, comprising a funnel receving a severed mold charge, a slide block in the funnel movable to open and close the thoroughfare through the same, and means for applying air pressure behind a charge in the funnel when the slide block has moved to its funnel closing position.

4. Apparatus for delivering a charge of molten glass to a mold, comprising a funnel, a chamber in the funnel, slide blocks in the chamber movable into and out of contact to open and close the outlet from the said chamber, and mold forming walls in the contacting faces of the said blocks.

5. Apparatus for delivering a charge of molten glass to a mold comprising a U-shaped funnel, one end of which is adapted to receive a severed mold charge, means for closing this end of the funnel, and means for admitting air between the said funnel closing means and the charge to propel the said charge out from the opposite end of the funnel into the mold.

6. In apparatus for making glassware, a mold, a funnel, means for moving one end of the funnel into and out of contact with the mold, means for propelling a charge of molten glass through the funnel into the mold when the funnel is in contact therewith, and a baffle plate carried by the said funnel to close the mold when the funnel is out of register therewith.

7. A method of delivering a charge of molten glass to a mold, wherein the charge is deposited in a funnel and is allowed to become partially solidified therein before being propelled out of the funnel by air pressure.

8. A method of delivering a charge of molten glass to a mold, wherein the charge is deposited in a funnel and is brought to a predetermined shape before being propelled out of the funnel by air pressure.

9. Apparatus for separately delivering severed charges of molten glass to a mold, said apparatus comprising a U-shaped funnel, a slide block in one limb of the funnel movable to open and close the thoroughfare through this funnel and means for supplying air under pressure within the funnel when the slide block is closed in order to expel out through the opposite limb of the said funnel a severed charge previously introduced into the funnel past the slide block when the latter is open.

10. Apparatus for delivering severed charges of glass separately to a mold, comprising a U-shaped funnel, a block movable in one limb of the funnel to open and close the thoroughfare therethrough, and means for supplying air under pressure to the space within the funnel between the said block and the outlet end of the other limb of the said funnel.

11. Apparatus for delivering severed charges of glass separately to a mold, comprising a U-shaped funnel, a block movable in one limb of the funnel to open and close the thoroughfare therethrough, a nozzle associated with the said funnel to convey a lubricating agent into the funnel and means for supplying air under pressure into the funnel when the said block is closed.

12. Apparatus for delivering a charge of molten glass to a mold comprising a U-shaped funnel whereof one part is movable axially and rotationally in another part and an extension piece removably mounted on the said movable part.

13. A method of delivering a charge of molten glass to a mold comprising delivering a severed charge into one limb of a U-shaped funnel, permitting the charge to descend in said limb, closing said limb above said charge, applying a cooling medium to the exterior of said funnel to partially solidify the charge therein, and admitting air under pressure to said limb above the charge to propel the latter out from the opposite limb of the funnel into the mold.

14. Apparatus for delivering a charge of molten glass to a mold, comprising a U-shaped funnel supported in a position to receive a severed mold charge in one end, means for closing said end of the funnel, means for admitting air to said funnel to propel the charge out from the other end of the funnel, and a jacket for the funnel through which a cooling fluid can be conducted.

CARL HENRY RANKIN.